(12) United States Patent
Baek

(10) Patent No.: US 12,722,545 B2
(45) Date of Patent: Sep. 1, 2026

(54) SEAT APPARATUS OF VEHICLE

(71) Applicant: HYUNDAI MOBIS CO., LTD., Seoul (KR)

(72) Inventor: Jong Hyun Baek, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 384 days.

(21) Appl. No.: 18/238,991

(22) Filed: Aug. 28, 2023

(65) Prior Publication Data

US 2024/0067063 A1 Feb. 29, 2024

(30) Foreign Application Priority Data

Aug. 31, 2022 (KR) ........................ 10-2022-0110043

(51) Int. Cl.
*B60N 2/30* (2006.01)

(52) U.S. Cl.
CPC .................................. *B60N 2/3065* (2013.01)

(58) Field of Classification Search
CPC .......... B60N 2/06; B60N 2/0732; B60N 2/12; B60N 2/146; B60N 2/20; B60N 2/3011; B60N 2/305; B60N 2/3065; B60N 2/7005; B60N 2002/971; B60R 11/00; B60R 2011/0005; B60R 2011/0082
See application file for complete search history.

(56) References Cited

FOREIGN PATENT DOCUMENTS

| | | | | |
|---|---|---|---|---|
| DE | 102014223192 A1 * | 5/2015 | ............. | B60N 2/203 |
| EP | 1316467 B1 * | 11/2005 | ........... | B60N 2/3059 |
| KR | 10-1834322 B1 | 3/2018 | | |

OTHER PUBLICATIONS

DE 102004061852 A1 with English Translation (Year: 2005).*

* cited by examiner

*Primary Examiner* — Lori Lyjak

(74) *Attorney, Agent, or Firm* — Morgan, Lewis & Bockius LLP

(57) ABSTRACT

The present disclosure relates to a seat apparatus of a vehicle, the seat apparatus includes a seat rail installed on a front floor, a first frame moving along the seat rail, a second frame coupled to the first frame, and moving together with the first frame, a seat cushion including a first coupling part rotatably coupled to the second frame, and a second coupling part disposed to be spaced apart from the first coupling part and detachably coupled to the second frame, and a seatback rotatably coupled to the seat cushion, and folded toward the seat cushion so as to adhere to the seat cushion.

9 Claims, 5 Drawing Sheets

FIG. 1

FRONT
REAR
100
101
103
110
120
200
201
300
310
311
311a
320
321
400
410
420
500

FIG. 2

FRONT
REAR
500
20
21
22
21a
30
400
310
410
311a
311
600
420
200
320
321
100
10

FRONT
REAR
500
30
20
21
22
400
310
311
311a
410
600
420
200
321
320
100
10

SEAT APPARATUS OF VEHICLE

CROSS-REFERENCE TO RELATED APPLICATION

This application claims the benefit under 35 U.S.C. § 119(a) of priority to Korean Patent Application No. 10-2022-0110043, filed on Aug. 31, 2022 in the Korean Intellectual Property Office, the entire disclosure of which is incorporated herein by reference for all purposes.

BACKGROUND

Field

Exemplary embodiments of the present disclosure relate to a seat apparatus of a vehicle, and more particularly, to a seat apparatus of a vehicle capable of accommodating a passenger seat in a dashboard.

Discussion of the Background

A seat on which a passenger can sit is installed in a vehicle. The seat of the vehicle includes a seat cushion supporting a lower body of the passenger and a seatback supporting an upper body of the passenger.

Recently, as the uses of a vehicle have diversified, the demand for a structure capable of changing an internal structure of the vehicle according to circumstances is increasing. That is, in addition to a basic loading box in the vehicle, more space may be required to load bulky and large amounts of cargo required for delivery, camping, or picnics.

In particular, in the case of a two-seater van in which a trunk room and an interior space are not completely separated, and a rear seat is removed so that a rear seat space is used as a loading space, a seatback of a passenger seat is folded to secure a wider loading space, and then cargo is loaded on an upper side of the folded seatback.

However, when the cargo is loaded on the upper side of the folded seatback according to a cargo loading method of an existing folded seat, the weight of the cargo acts as a load on the seat, and when the cargo is frequently and repeatedly loaded or the cargo is heavy, the seat may be deformed or damaged. Accordingly, there is a need to improve this situation.

The background technology of the present disclosure is disclosed in Korean Patent No. 10-1834322 (published on Mar. 5, 2018 and entitled "SEAT RAIL DEVICE AND VEHICLE SEAT ASSEMBLY HAVING THE SAME").

SUMMARY

Various embodiments are directed to a seat apparatus of a vehicle in which a folded passenger seat is accommodated in a upright state in a dashboard.

A seat apparatus of a vehicle according to the present disclosure may include: a seat rail installed on a front floor; a first frame moving along the seat rail; a second frame coupled to the first frame, and moving together with the first frame; and a seat cushion including a first coupling part rotatably coupled to the second frame, and a second coupling part disposed to be spaced apart from the first coupling part and detachably coupled to the second frame.

The seat apparatus may further include a seatback rotatably coupled to the seat cushion, and folded toward the seat cushion.

The seat cushion toward which the seatback is folded may be accommodated inside a dashboard.

The seat cushion toward which the seatback is folded may rotate in a space part provided below the dashboard, and be accommodated in an upright state inside the dashboard.

The dashboard may include: a body part provided with an opening; and a cover part rotatably coupled to the body part, and configured to open and close the opening.

An end of the cover part coupled to the body part may be bent toward the front floor.

When the cover part rotates upward, and the opening is opened, the cover part might not interfere with the rotatable seat cushion, and when the cover part rotates downward, and the opening is closed, the cover part may be disposed on a movement path of the upright seat cushion.

The second frame may include: a front frame coupled to a front end of the first frame, and having a hinge part hinged to the first coupling part; and a rear frame located at a rear of the front frame, coupled to a rear end of the first frame, and having a striker assembly on an outer side surface thereof.

The second coupling part may be a latch assembly detachably coupled to the striker assembly.

The seat apparatus may further include a lifter assembly of which length is extended or reduced when the seat cushion rotates, and one end of the lifter assembly may be rotatably coupled to the hinge part, and the other end of the lifter assembly may be rotatably coupled to the seat cushion.

According to the present disclosure, a seat cushion with a folded seatback can rotate and be accommodated in a upright state in a dashboard provided in front of a front passenger seat of a vehicle, which makes it possible to expand a loading space inside the vehicle.

BRIEF DESCRIPTION OF THE DRAWINGS

FIG. 1 is a perspective view schematically illustrating a seat apparatus of a vehicle according to an embodiment of the present disclosure.

FIG. 2 is a perspective view schematically illustrating a state in which a seat cushion is upright in a seat apparatus of a vehicle according to an embodiment of the present disclosure.

DETAILED DESCRIPTION OF THE ILLUSTRATED EMBODIMENTS

Figure 3:
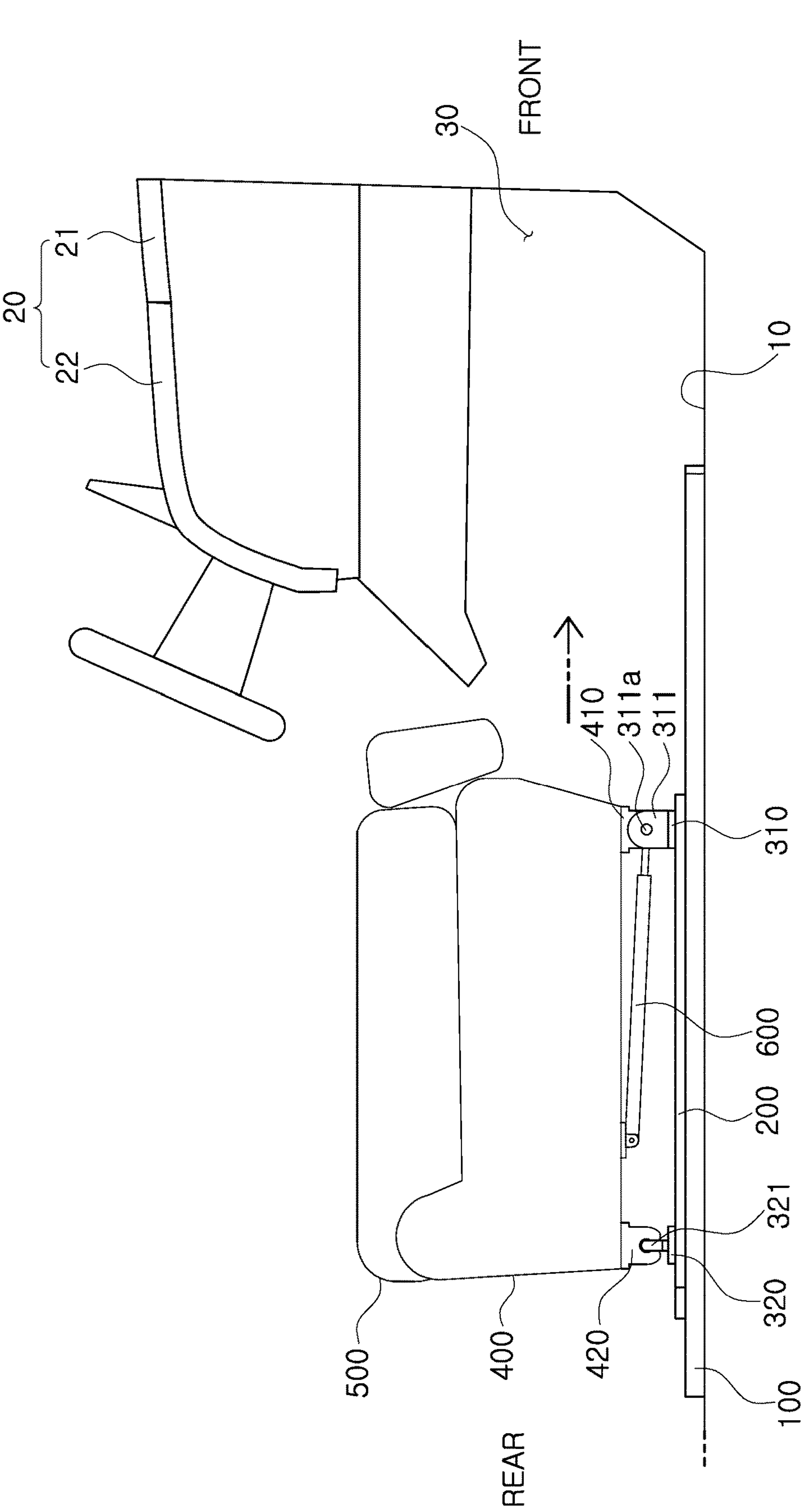
FIGS. 3 to 5 are exemplary diagrams illustrating an operating state of a seat apparatus of a vehicle according to an embodiment of the present disclosure.

Hereinafter, a seat apparatus of a vehicle will be described in detail with reference to the accompanying drawings through various exemplary embodiments. The thicknesses of lines or the sizes of components in the drawings may have been exaggerated for the clarity of a description and for convenience' sake. Furthermore, terms to be described below have been defined by taking into consideration their functions in the present disclosure, and may be changed depending on a user or operator's intention or practice. Accordingly, such terms should be defined based on the overall contents of this specification.

Figure 1:
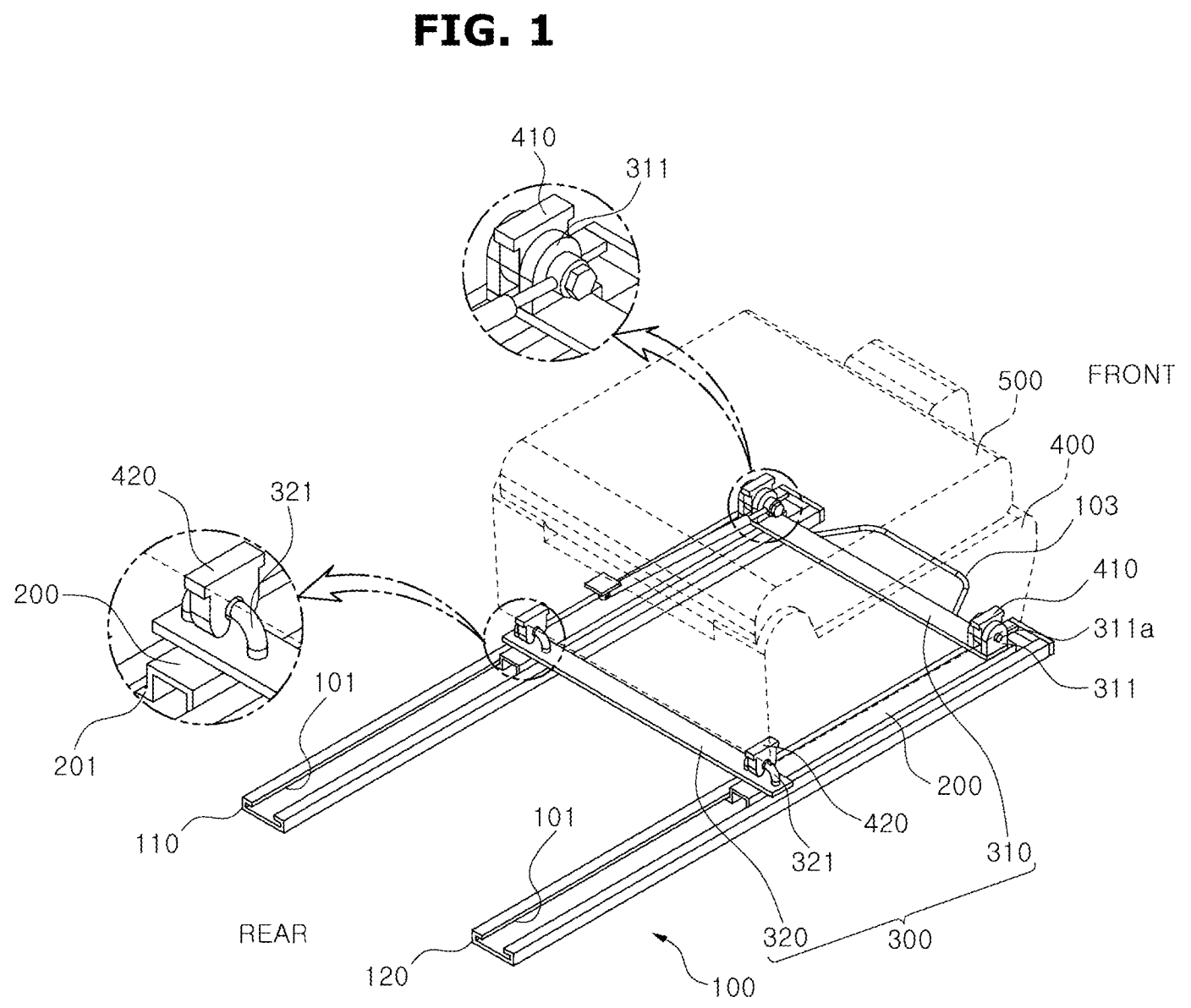
Figure 2:
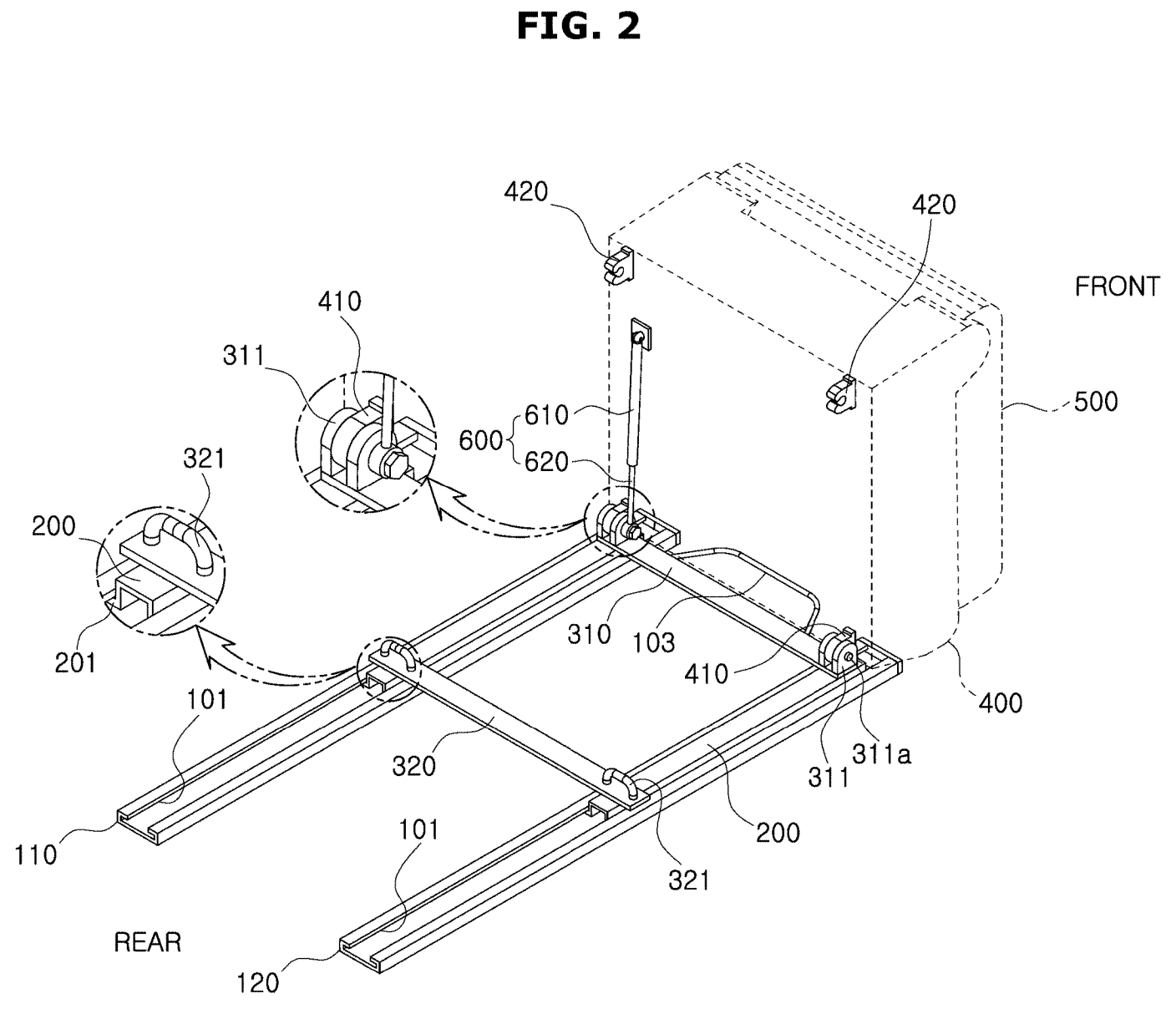
Figure 4:
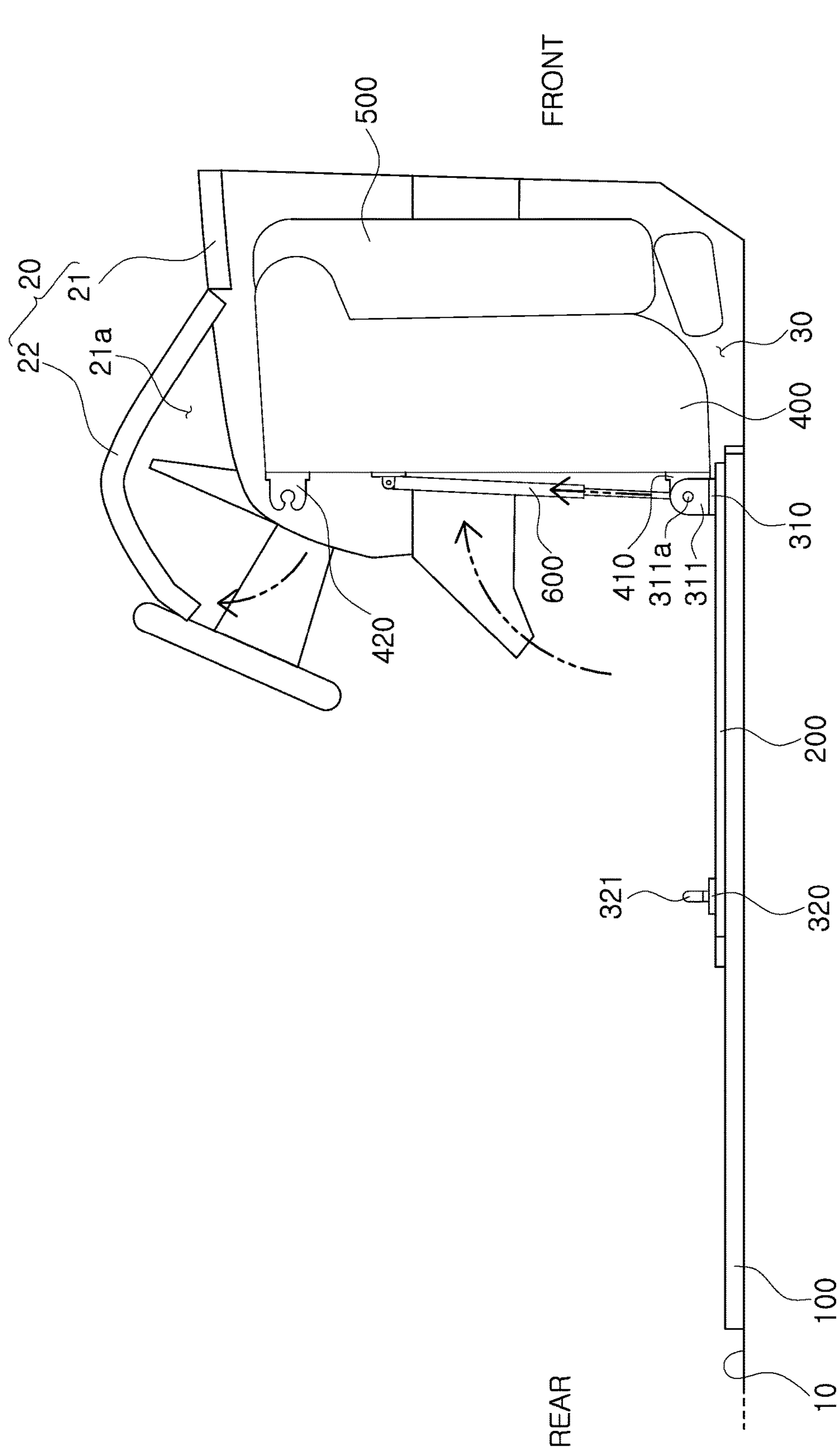
Figure 5:
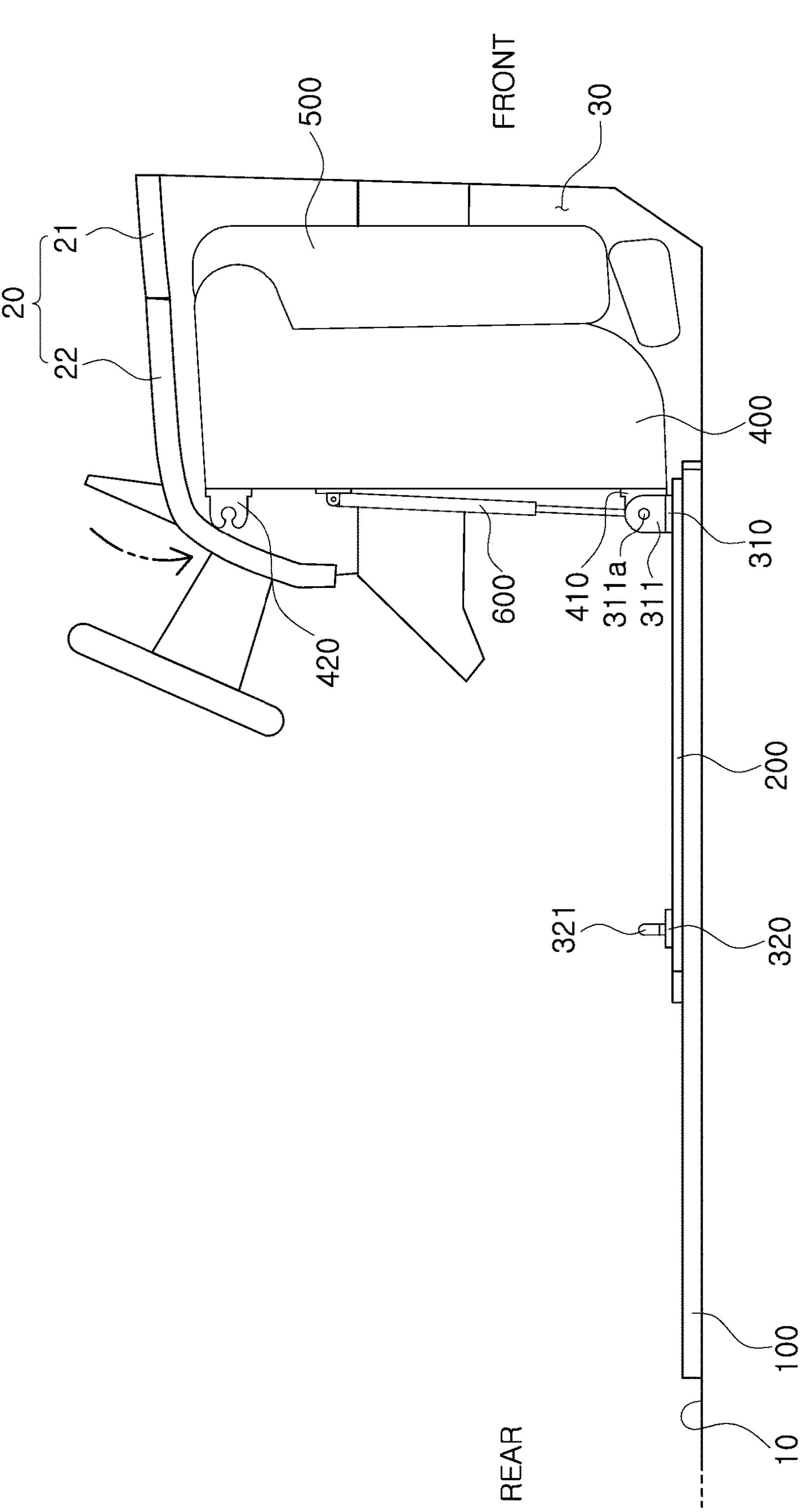

FIG. 1 is a perspective view schematically illustrating a seat apparatus of a vehicle according to an embodiment of the present disclosure, FIG. 2 is a perspective view schematically illustrating a state in which a seat cushion is upright in a seat apparatus of a vehicle according to an embodiment of the present disclosure, and FIGS. 3 to 5 are exemplary diagrams illustrating an operating state of a seat apparatus of a vehicle according to an embodiment of the present disclosure.

Referring to FIGS. 1 to 5, a seat apparatus of a vehicle according to an embodiment of the present disclosure includes a seat rail 100, a first frame 200, a second frame 300, a seat cushion 400, and a seatback 500, which are described in detail as follows.

The seat rail 100 is installed on a front floor 10 forming an interior floor of the vehicle. In the present embodiment, a rear trunk room and an interior space of the vehicle might not be completely separated, and the vehicle may be a two-seater van in which a rear seat space is used as a loading space by removing a rear seat.

The seat rail 100 is installed on an upper surface of the front floor 10 of a front passenger seat in front and rear directions of the vehicle. In this case, the seat rail 100 may include a first seat rail 110 and a second seat rail 120 disposed side by side to be spaced apart from each other on both sides thereof.

The seat rail 100 may be formed in a hollow shape having an upper surface opening and an inner space. At an upper end of the seat rail 100, a locking jaw 101 protruding to have a certain length toward the upper surface opening may be formed. The locking jaw 101 may prevent the first frame 200, which is to be described later, from being upwardly separated from the seat rail 100 through the upper surface opening formed in the seat rail 100.

The first frame 200 is coupled to the seat rail 100. The first frame 200 is provided as a pair to be coupled to the first seat rail 110 and the second seat rail 120, respectively.

A lower portion of the first frame 200 is accommodated in an inner space of the seat rail 100, and an upper portion of the first frame 200 is exposed to the outside through the upper surface opening of the seat rail 100. A locking protrusion 201 caught on the locking jaw 101 formed in the seat rail 100 may be formed on an outer side surface of a lower end of the first frame 200.

The first frame 200 slides along the seat rail 100. That is, the first frame 200 linearly moves in a longitudinal direction of the seat rail 100. Accordingly, the first frame 200 may move toward the front and rear directions of the vehicle.

Meanwhile, a position adjusting part 103 may be installed on the seat rail 100 to adjust front and rear positions of the sliding first frame 200. The position adjusting part 103 may restrict the sliding movement of the first frame 200, and release the restriction of the first frame 200 by lever manipulation of a passenger.

The second frame 300 is coupled to the first frame 200. The second frame 300 serves as a connection between the pair of first frames 200 coupled to the first seat rail 110 and the second seat rail 120, respectively.

The second frame 300 is disposed in a width direction of the vehicle perpendicularly to the seat rail 100 and the first frame 200. In other words, one end of the second frame 300 is coupled to an upper surface of the first frame 200 coupled to the first seat rail 110, and the other end of the second frame 300 is coupled to the upper surface of the first frame 200 coupled to the second seat rail 120.

In this case, the second frame 300 is fixed to the first frame 200 through bolting or welding. Accordingly, the second frame 300 moves together with the first frame 200.

The second frame 300 may include a front frame 310 and a rear frame 320.

The front frame 310 is coupled to a front end of the first frame 200 facing a front of the vehicle. A hinge part 311 is provided at both side ends of the front frame 310. A first coupling part 410, which is to be described later, is coupled to the hinge part 311 via a hinge shaft 311*a*.

The rear frame 320 is disposed to be spaced apart from a rear of the front frame 310. The rear frame 320 is coupled to a rear end of the first frame 200 facing a rear of the vehicle. A striker assembly 321 to which a second coupling part 420 to be described later is detachably coupled is provided on an outer upper surface of both side ends of the rear frame 320.

The seat cushion 400 supports a lower body of the passenger, and is provided horizontally on an upper side of the second frame 300. The seat cushion 400 is provided with the first coupling part 410 and the second coupling part 420.

The first coupling part 410 is provided on a lower surface of the seat cushion 400, and is hinged to the hinge part 311 of the front frame 310 via the hinge shaft 311*a*. Accordingly, the seat cushion 400 rotates in the front and rear directions of the vehicle by using the hinge shaft 311*a* as a rotation shaft.

The second coupling part 420 is disposed to be spaced apart from a rear of the first coupling part 410. The second coupling part 420 is provided on the lower surface of the seat cushion 400, and is detachably coupled to the striker assembly 321 provided on the rear frame 320.

In this case, the second coupling part 420 may be a latch assembly. The latch assembly may be fixedly coupled to the striker assembly 321, and be decoupled from the striker assembly 321 by manipulation of the passenger.

The seatback 500 supports an upper body of the passenger, and is rotatably coupled to the seat cushion 400. The seatback 500 is provided vertically on an upper side of a rear end of the seat cushion 400 facing the rear of the vehicle.

The rear end of the seat cushion 400 and a lower end of the seat back 500 are coupled via a hinge shaft, and the seatback 500 may rotate in the front and rear directions of the vehicle by using the hinge shaft as a rotation shaft. That is, the seatback 500 may be folded so that a front surface of the seatback 500 adheres to an upper surface of the seat cushion 400. In this case, a recliner for adjusting an angle of the seatback 500 in the front and rear directions may be installed on the hinge shaft.

In addition, a headrest for supporting the head and neck of the passenger may be mounted on an upper end of the seatback 500. Similarly to the seatback 500, an angle of the headrest may be adjusted in the front and rear directions.

The seat apparatus for the vehicle according to the present embodiment may further include a lifter assembly 600.

One end of the lifter assembly 600 is rotatably hinged to an outer side surface of the hinge part 311, and the other end of the lifter assembly 600 is rotatably hinged to the lower surface of the seat cushion 400. The lifter assembly 600 may include a cylinder 610 having a hollow in which fluid is accommodated and a rod 620 which is axially coupled to the cylinder 610 and moves in an axial direction of the cylinder 610.

The lifter assembly 600 is extended in length by internal hydraulic pressure when the seat cushion 400 rotates toward the front of the vehicle, and is reduced in length by pressure of the seat cushion 400 when the seat cushion 400 rotates toward the rear of the vehicle.

The seat cushion 400 toward which the seatback 500 is folded rotates toward the front of the vehicle in a space part 30 below a dashboard 20 provided in a front portion of the interior of the vehicle, and is accommodated inside the dashboard 20 in an upright state.

The dashboard 20 includes a body part 21 and a cover part 22.

The body part 21 is provided with an opening 21*a* of which a central portion is opened upward and downward and an outer side surface facing the seat cushion 400 and the seatback 500 is opened.

The cover part 22, which is for opening and closing the opening 21*a*, is hinged to the body part 21.

A free end of the cover part 22 is formed in a bent shape inclined downward at a certain angle toward the front floor 10.

Specifically, when the cover part 22 rotates upward from the body part 21 and the opening 21*a* is opened, the cover part 22 does not interfere with the seat cushion 400 that rotates in one direction toward the front of the vehicle in the space part 30. Accordingly, when the seat cushion 400 rotates in the space part 30, the seat cushion 400 does not collide with the cover part 22. Consequently, since it is possible for the seat cushion 400 to be disposed in a desired position and alignment direction, the seat cushion 400 may be accommodated in an upright state so that the loading space may be efficiently used, and the other interior space of the vehicle may be secured more widely.

Conversely, when the cover part 22 rotates downward from the body part 21 and the opening 21*a* is closed, the cover part 22 interferes with the upright seat cushion 400 inside the dashboard 20. That is, since the cover part 22 is disposed on a movement path of the upright seat cushion 400, the seat cushion 400 is caught in the cover part 22 and does not move to the outside of the space part 30 even though the seat cushion 400 moves unintentionally as the vehicle suddenly starts or stops. Accordingly, it is possible to prevent safety accidents due to sudden movement of the seat cushion 400 in advance from occurring.

An operating process of the sear apparatus of the vehicle in accordance with an embodiment of the present disclosure, which has the above-described configuration, is described as follows.

FIGS. 3 to 5 are exemplary diagrams illustrating an operating state of the seat apparatus of the vehicle according to an embodiment of the present disclosure.

Referring to FIGS. 1 to 3, the seatback 500 rotates and is folded toward the front of the vehicle so that the front surface of the seatback 500 adheres to the upper surface of the seat cushion 400.

When the seat cushion 400 is pushed in a direction where the dashboard 20 is located while a lever of the position adjusting part 103 located in front of the seat cushion 400 toward which the seatback 500 is folded is pulled, the seat cushion 400 slides along the seat rail 100.

Referring to FIGS. 1, 2 and 4, when the seat cushion 400 with the folded seatback 500, which slides along the seat rail 100, is located in the space part 30 provided below the dashboard 20, the cover part 22 rotates upward from the body part 21, and the opening 21*a* formed in the body part 21 is opened.

When the rear end of the seat cushion 400 is lifted, the first coupling part 410 rotates toward the front of the vehicle by using the hinge shaft 311*a* of the hinge part 311 as the rotation shaft.

In this case, the length of the lifter assembly 600 is extended by the internal hydraulic pressure of the lifter assembly 600, the seat cushion 400 toward which the seatback 500 is folded is placed in a vertically upright state by the extension operation of the lifter assembly 600 even though the rear end of the seat cushion 400 is no longer lifted, and reverse direction rotation of the seat cushion 400 is restrained by the internal hydraulic pressure of the lifter assembly 600.

Referring to FIGS. 1, 2 and 5, the cover part 22 rotates downward from the body part 21, and the opening 21*a* formed in the body part 21 is closed.

In the seat apparatus for the vehicle according to the present embodiment, the seat cushion 400 toward which the seatback 500 is folded rotates and is accommodated in the upright state inside the dashboard 20 provided in front of the front passenger seat, thereby expanding the loading space.

The present disclosure has been described above with reference to the embodiments illustrated in the accompanying drawings, but the embodiments are merely for illustrative purposes. A person having ordinary knowledge in the art to which the present disclosure pertains will understand that various modifications and other equivalent embodiments are possible from the embodiments. Accordingly, the true technical scope of the present disclosure should be defined by the following claims.

What is claimed is:

1. A seat apparatus of a vehicle, comprising:
- a seat rail installed on a front floor of the vehicle;
- a first frame moving along the seat rail;
- a second frame coupled to the first frame, and moving together with the first frame; and
- a seat cushion including a first coupling part rotatably coupled to the second frame, and a second coupling part disposed to be spaced apart from the first coupling part and detachably coupled to the second frame, wherein the second frame includes:
- a front frame coupled to a front end of the first frame, and having a hinge part hinged to the first coupling part; and
- a rear frame located at a rear of the front frame, coupled to a rear end of the first frame, and having a striker assembly on an outer side surface thereof.

2. The seat apparatus of claim 1, further comprising: a seatback rotatably coupled to the seat cushion, and folded toward the seat cushion.

3. The seat apparatus of claim 2, wherein the seat cushion toward which the seatback is folded is accommodated in a space provided by a dashboard of the vehicle.

4. The seat apparatus of claim 3, wherein the seat cushion toward which the seatback is folded rotates in a space part provided below the dashboard in the space provided by the dashboard, and is accommodated in an upright state in the space provided by the dashboard including inside the dashboard and the space part provided below the dashboard.

5. The seat apparatus of claim 4, wherein the dashboard includes:
- a body part provided with an opening; and
- a cover part rotatably coupled to the body part, and configured to open and close the opening.

6. The seat apparatus of claim 5, wherein an end of the cover part coupled to the body part is bent toward the front floor.

7. The seat apparatus of claim 5, wherein when the cover part rotates upward, and the opening is opened, the cover part does not interfere with a rotatable seat cushion, and
- when the cover part rotates downward, and the opening is closed, the cover part is disposed on a movement path of an upright seat cushion.

8. The seat apparatus of claim 1, wherein the second coupling part is a latch assembly detachably coupled to the striker assembly.

9. The seat apparatus of claim 1, further comprising a lifter assembly of which length is extended or reduced when the seat cushion rotates, wherein one end of the lifter assembly is rotatably coupled to the hinge part, and the other end of the lifter assembly is rotatably coupled to the seat cushion.

* * * * *